(12) United States Patent
Chidambaram

(10) Patent No.: US 10,030,205 B2
(45) Date of Patent: Jul. 24, 2018

(54) COMPOSITIONS AND METHODS OF MAKING BIOFUEL

(71) Applicant: Board of Regents of the Nevada System of Higher Education, on behalf of the University of Nevada, Reno, Reno, NV (US)

(72) Inventor: Dev Chidambaram, Reno, NV (US)

(73) Assignee: Board of Regents of the Nevada System of Higher Education, on behalf of the University of Nevada, Reno, Reno, NV (US)

( * ) Notice: Subject to any disclaimer, the term of this patent is extended or adjusted under 35 U.S.C. 154(b) by 22 days.

(21) Appl. No.: 14/815,618

(22) Filed: Jul. 31, 2015

(65) Prior Publication Data

US 2016/0032203 A1 Feb. 4, 2016

Related U.S. Application Data

(60) Provisional application No. 62/032,267, filed on Aug. 1, 2014.

(51) Int. Cl.
*C11C 3/00* (2006.01)
*C10L 1/02* (2006.01)
*B01J 31/02* (2006.01)
*B01J 35/00* (2006.01)
*B01J 23/04* (2006.01)
(Continued)

(52) U.S. Cl.
CPC .............. *C10L 1/026* (2013.01); *B01J 23/04* (2013.01); *B01J 31/0237* (2013.01); *B01J 31/0238* (2013.01); *B01J 31/0244* (2013.01); *B01J 35/0006* (2013.01); *B01J 2231/49* (2013.01); *C10L 1/1216* (2013.01); *C10L 1/2335* (2013.01); *C10L 2200/0476* (2013.01); *C10L 2270/026* (2013.01); *C10L 2290/08* (2013.01); *C10L 2290/141* (2013.01); *C10L 2290/24* (2013.01); *C10L 2290/545* (2013.01); *Y02E 50/13* (2013.01)

(58) Field of Classification Search
CPC ...................................................... C10L 1/026
USPC ........................................................ 554/167
See application file for complete search history.

(56) References Cited

PUBLICATIONS

Wang et al., "Catalytic synthesis of methyl oleate by morpholine basic ionic liquid.", Journal of Fuel Chemistry and Technology, 2013, vol. 41 No. 1, Online: Jan. 31, 2013, (abstract).*

(Continued)

*Primary Examiner* — Deborah D Carr
(74) *Attorney, Agent, or Firm* — Klarquist Sparkman, LLP

(57) ABSTRACT

The present disclosure concerns embodiments of a catalyst system, such as a mixed catalyst composition, that can be used to make biofuel. In some embodiments, the mixed catalyst composition can comprise an inorganic catalyst and an organic catalyst, such as a cyclic organic catalyst. In particular disclosed embodiments, a mixed catalyst composition comprising, consisting essentially of, or consisting of an inorganic catalyst and an organic catalyst can be used to enhance the production of biofuel, such as biodiesel, by reducing the amount of time needed to make the biofuel as compared to that needed for the inorganic catalyst or the organic catalyst independently. Also disclosed herein are combinations and kits comprising, consisting essentially of, or consisting of embodiments of a mixed catalyst composition.

5 Claims, 7 Drawing Sheets

(51) Int. Cl.
     C10L 1/12      (2006.01)
     C10L 1/233     (2006.01)

(56) References Cited

PUBLICATIONS

Abbaszaadeh et al., "Current biodiesel production technologies: A comparative review," *Energy Conversion and Management*, 63: 138-148, Aug. 25, 2012.

Alhassan et al., "Co-solvents transesterification of cotton seed oil into biodiesel: Effects of reaction conditions on quality of fatty acids methyl esters," *Energy Conversion and Management*, 84: 640-648, May 22, 2014.

Aransiola et al., "A review of current technology for biodiesel production: State of the art," *Biomass and Bioenergy*, 61: 276-297, Dec. 23, 2013.

Cerce et al., "Biodiesel-Transesterification of Biological Oils with Liquid Catalysts: Thermodynamic Properties of Oil-Methanol-Amine Mixtures," *Ind. Eng. Chem. Res.*, 44: 9535-9541, Aug. 12, 2005.

Kim et al., "Transesterification of Glycerides Using a Heterogeneous Resin Catalyst Combined with a Homogeneous Catalyst," *Energy & Fuels*, 22: 3594-3599, Oct. 16, 2008.

Ma et al., "Biodiesel production: a review," *Bioresource Technology*, 70: 1-15, Oct. 12, 1999.

Salvi et al., "Biodiesel resources and production technologies—A review," *Renewable and Sustainable Energy Reviews*, 16: 3680-3689, Apr. 30, 2012.

Schuchardt et al., "Alkylguanidines as catalysts for the transesterification of rapeseed oil," *Journal of Molecular Catalysis A: Chemical*, 99: 65-70, published online Jul. 24, 2001.

Stepan et al., "Biodiesel and Surfactants from Fats," *Rev. Chim.*, 63 (6): 646-650, Dec. 2012.

Wang et al., "Catalytic transesterification of crude rapeseed oil by liquid organic amine and co-catalyst in supercritical methanol," *Catalysis Communications*, 8: 1511-1515, Dec. 16, 2006.

Yao et al., "Low boiling point organic amine-catalyzed transesterification of cottonseed oil to biodiesel with trace amount of KOH as co-catalyst," *Fuel*, 89: 3871-3875, Jul. 16, 2010.

\* cited by examiner

COMPOSITIONS AND METHODS OF MAKING BIOFUEL

CROSS REFERENCE TO RELATED APPLICATION

This application claims the benefit of U.S. Provisional Patent Application No. 62/032,267, filed Aug. 1, 2014, the entirety of which is incorporated herein by reference.

ACKNOWLEDGMENT OF GOVERNMENT SUPPORT

This invention was made with government support under grant number DE-EE0003158 awarded by the Department of Energy. The government has certain rights in the invention.

FIELD

The present disclosure concerns catalyst compositions, such as mixed catalyst compositions, methods of using the catalyst compositions to make biofuel, as well as kits comprising the compositions.

BACKGROUND

Biofuels are increasingly becoming a part of the solution in efforts focused on minimizing the use of fossil fuels. Among these, bioethanol and biodiesel have been chosen by governments to be desirable substitutes for diesel and petroleum fuels. In considering certain factors, certain biofuels can afford benefits over other types of biofuels. For example, biodiesel has some striking features that make it distinguishable from other biofuels, such as bioethanol. Biodiesel has a positive net energy gain (e.g., a ratio of 4:1) in comparison to ethanol, which under optimistic conditions is calculated as 1.3:1. Using biodiesel in diesel engines has resulted in no concerns with engine problems. Also, biodiesel can have a higher specific energy value of 120,000 BTU when compared to 80,000 BTU of bioethanol. Among the methods used for producing biodiesel from conventional feedstock, alkali based transesterification has advantages of both economy and feasibility. Furthermore, this process can lead to conversion and yields as high as ~98% with little or no side reactions.

There exists a need in the art for a catalytic system that can be used to make biofuel under time- and cost-efficient conditions that are scalable.

SUMMARY

Disclosed herein are embodiments of a combination, comprising an inorganic catalyst, a cyclic organic catalyst, a lipid, and an alcohol. In some embodiments, the combination can be used to produce a biofuel, such as biodiesel. In one embodiment, the amount of the inorganic catalyst present in the combination can be equal to the amount of the cyclic organic catalyst present in the combination. In another embodiment, the amount of inorganic catalyst ranges from 0.01 wt % to 500 wt % of the total lipid weight present in the combination. In one embodiment, the amount of the cyclic organic catalyst ranges from 0.01 wt % to 500 wt % of the total lipid weight present in the combination.

Also disclosed herein are embodiments of a method for enhancing biofuel production, comprising combining a lipid and an alcohol with a mixed catalyst composition comprising an inorganic catalyst and a cyclic organic catalyst, mixing the lipid and the alcohol with the mixed catalyst composition at a temperature ranging from 25° C. to 150° C., and wherein the biofuel produced using the mixed catalyst composition, is obtained in 25% to 75% less time than biofuel produced using an inorganic catalyst or a cyclic organic catalyst independently. In some embodiments, the method can further comprise mixing the lipid, the alcohol, and the mixed catalyst composition for a time period sufficient to produce a biofuel. In some embodiments, the time period for mixing can range from 1 hour to 2 hours. In one embodiment, the alcohol can first be combined with the inorganic catalyst and the cyclic organic catalyst, sequentially or simultaneously, and then combined with the lipid. In some embodiments, the lipid, the alcohol, and the mixed catalyst composition can be mixed at 70° C. In some embodiments, the amount of the inorganic catalyst present in the combination is equal to the amount of cyclic organic catalyst present in the combination.

Another embodiment disclosed herein concerns a method for making biofuel, comprising combining a mixed catalyst composition comprising an inorganic catalyst and a cyclic organic catalyst with a lipid, an alcohol, or a combination thereof. In some embodiments of this method, the mixed catalyst composition can be mixed with the alcohol prior to addition of the lipid. In some embodiments, the inorganic catalyst and the cyclic organic catalyst of the mixed catalyst composition can be mixed sequentially or substantially simultaneously with the alcohol.

Yet other embodiments disclosed herein concern a kit for making biofuel, comprising a first container comprising an inorganic catalyst and a second containing comprising a cyclic organic catalyst. A mixed catalyst composition also is described herein and can comprise an inorganic catalyst and a cyclic organic catalyst wherein the amount of the inorganic catalyst, the cyclic organic catalyst, or both, are present in an amount ranging from 0.01 wt % to 500 wt % of a biofuel precursor to which the mixed catalyst composition is added.

The foregoing and other features and advantages of the disclosure will become more apparent from the following detailed description, which proceeds with reference to the accompanying figures.

DETAILED DESCRIPTION

I. Terms and Definitions

Figure 1:
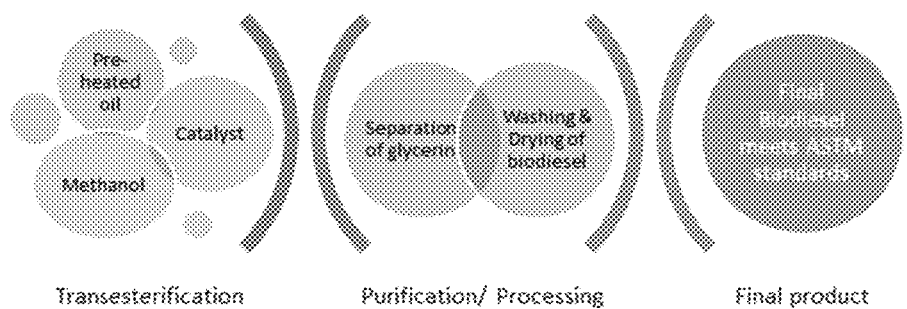
FIG. 1 is a schematic illustration of transesterification reaction steps; the glycerin portion of the oil molecule is replaced by alcohol and is eventually removed from the mixture after separation, washing and drying processes and biodiesel is the final product.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

To facilitate review of the various embodiments of the disclosure, the following explanations of specific terms are provided:

Alcohol: An organic compound comprising at least one hydroxyl group. Alcohols can further comprise at least one carbon atom, which can be part of an aliphatic group, a cycloaliphatic (alicyclic) group, a heteroaliphatic group, a cycloheteroaliphatic (heterocyclic) group, a polycyclic group, an aryl group, or a heteroaryl group, as examples.

Biofuel: A fuel derived from a metabolic product of a living organism. Biofuel can be a renewable energy source, unlike other natural resources such as petroleum, coal and nuclear fuels.

Biodiesel: A type of biofuel. Biodiesel can be a diesel-equivalent processed fuel derived from biological sources, which can be used for various uses, such as in unmodified diesel-engine vehicles. In some embodiments, biodiesels are attractive for fuels, and some other uses, because they can have a low vapor pressure, can be non-toxic and stable, and may not deteriorate or detonate upon mild heating. In some embodiments, biodiesels can be the mono alkyl esters of long chain fatty acids derived from renewable lipid sources.

Catalyst: A compound, which can be present in smaller amounts relative to reactants, that increases the rate of a chemical reaction without itself being incorporated into the final reaction product. A catalyst also may enable a reaction to proceed under different conditions (e.g., at a lower temperature) than otherwise possible.

Enhance or increase: To increase the quality, amount, or strength of something. In one example, the catalyst compositions disclosed herein can increase or enhance the production of a biofuel relative to activity in the absence of the catalyst compositions.

Fatty acid: A carboxylic acid having a long, unbranched, aliphatic chain or tail. Fatty acids can comprise from at least 1 carbon atom to 100 carbon atoms, such as from at least 1 carbon atom to 75 carbon atoms, or from at least 1 carbon atom to 50 carbon atoms. Fatty acids can be represented by the general formula RCOOH, where R is a saturated or unsaturated aliphatic chain.

Lipid: An inclusive term for fats and fat-derived materials. This term can include substances that are (1) relatively insoluble in water but soluble in organic solvents; (2) related either actually or potentially to fatty acid esters, fatty alcohols, sterols, waxes, etc.; and (3) utilizable by a living organism.

II. Introduction

Disclosed herein are compositions, kits, and methods for enhancing production of biofuels and minimizing reaction times involved in making biofuels. Also disclosed herein are reaction components for use with the disclosed catalyst compositions that give rise to the biofuel product. Such components can include lipids and alcohols. In some embodiments, the lipids disclosed herein are suitable for use as biofuel precursors because they meet certain parameters. For example, the amount of water and free fatty acids present in the incoming feedstock lipid can be controlled so that the free fatty acid or water content is not so high as to form soap. Soap typically is formed during biofuel production due to reaction of the acid components of lipid with a basic catalyst and can result in difficulties in separating glycerin from the biofuel. In some embodiments, the biofuel made using the disclosed components is biodiesel. In some embodiments, the biodiesel can be a clear liquid with a viscosity similar to that of petro-diesel. In some embodiments, the biofuels made using the compositions and methods disclosed herein can be decolorized and/or deodorized. A general method for base-catalyzed biodiesel production is illustrated schematically in FIG. 1.

III. Catalyst and Compositions Thereof

Disclosed herein are embodiments of catalysts, and combinations thereof, which can be used to make biofuel. In particular disclosed embodiments, a mixed catalyst composition can be used to enhance biofuel production. In particular disclosed embodiments, the catalysts of the mixed catalyst composition can be selected from inorganic catalysts, organic catalysts, and combinations thereof. These catalyst compositions can be combined with one or more biofuel precursors capable of producing a biofuel.

In some embodiments, the catalysts can be selected from at least one inorganic catalyst, at least one organic catalyst, and combinations thereof. In particular disclosed embodiments, at least two catalysts are used to form a mixed catalyst composition.

Suitable inorganic catalysts can be selected from compounds that are capable of catalyzing a transesterification reaction between a lipid and an alcohol. In some embodiments, the inorganic catalyst can be an inorganic base, such as a hydroxide compound. Exemplary inorganic catalysts can be selected from potassium hydroxide (KOH), sodium hydroxide (NaOH), lithium hydroxide (LiOH), or combinations thereof. In exemplary embodiments, the inorganic catalyst is KOH.

Suitable organic catalysts can be compounds capable of interacting with the inorganic catalyst to enhance the catalytic effect of the inorganic catalyst in catalyzing a transesterification reaction between a lipid and an alcohol. In some embodiments, the organic catalysts disclosed herein can be used to enhance the activity of an inorganic catalyst and can do so without any modification to methods of making biofuel. Also, using the organic catalyst in combination with the inorganic catalyst can reduce the amount of soap formation that occurs when biofuels are made thereby simplifying the purification process and also increasing the amount of biofuel obtained.

In some embodiments, the organic catalyst can be a heteroatom-containing compound, such as a nitrogen-containing compound, an oxygen-containing compound, a sulfur-containing compound, a phosphorous-containing compound, or a compound comprising a combination of such heteroatoms. In some embodiments, the organic catalyst can be a nitrogen-containing compound further comprising at least one additional heteroatom. In additional embodiments, the organic catalyst can be a cyclic heteroatom-containing compound. Exemplary cyclic heteroatom-containing compounds can be selected from cyclic compounds comprising at least 3 ring atoms, any one of which can be a heteroatom. In some embodiments, the cyclic heteroatom-containing compounds can comprise 3 ring atoms, 4 ring atoms, 5 ring atoms, 6 ring atoms, 7 ring atoms, 8 ring atoms, and up to 15 ring atoms, any one or more of which can be a heteroatom. In exemplary embodiments, the organic catalyst can be a nitrogen-containing cyclic compound, such as morpholine, methyl morpholine oxide, ethyl morpholine, or the like.

Also disclosed herein are biofuel precursors for use in the disclosed methods of making biofuel. In some embodiments, the biofuel precursors can be a lipid, such as a fat or oil. In some embodiments, suitable biofuel precursors can comprise at least one triglyceride unit. Additional biofuel precursors also include alcohols, which are capable of reacting with one or more lipid biofuel precursors to form a transesterified compound.

Exemplary lipids can include fats and/or oils, such as (but not limited to) vegetable oils or animal fat-based oils. Exemplary lipids can include, but are not limited to, rapeseed oil, soybean oil, sunflower oil, flax oil, jojoba oil, mustard oil, palm oil, coconut oil, hemp oil, waste vegetable oil, corn oil, canola oil, coffee oils, tallow, lard, chicken fat, and combinations thereof. In some embodiments, the oils used in the disclosed method can have a free fatty acid content ranging from 0 to 99%, such as 0 to 40%, or 0-10%.

The lipids disclosed herein can be combined with an alcohol, such as a short-chain alcohol (e.g., fewer than 10 carbon atoms) selected from, for example, methanol, ethanol, propanol, butanol, or the like. In exemplary embodiments, methanol or ethanol can be used.

In exemplary embodiments, morpholine and KOH can be combined to form a mixed catalyst composition capable of reacting with oil and an alcohol, such as methanol, to form a biofuel, such as biodiesel.

Any suitable catalytic amount of the inorganic catalyst and the organic catalyst can be used. In particular disclosed embodiments, the amount of the inorganic catalyst used in the methods disclosed herein can range from 0.01 to 500 wt % of the total lipid weight, such as 0.01 to 100 wt % of the total lipid weight, or 0.01 to 10 wt % of the total lipid weight, or 0.01 to 2 wt % of the total lipid weight. In exemplary embodiments, the amount of the inorganic catalyst that can be used can be 1.5 wt % of the total lipid weight.

In particular disclosed embodiments, the amount of the organic catalyst that can be used can range from 0.01 to 500 wt % of the total lipid weight, such as 0.01 to 100 wt % of the total lipid weight, or 0.01 to 10 wt % of the total lipid weight, or 0.01 to 2 wt % of the total lipid weight. In some embodiments, the amount of the organic catalyst can be the same as the amount of the inorganic catalyst. In exemplary embodiments, the amount of the organic catalyst can be 1.5 wt % of the total lipid weight. In an independent embodiment, the amount of the organic catalyst is lower than 5 wt % of the total lipid weight.

The amount of alcohol used in the disclosed methods can range from 0.01 to 5000 vol % of the total reaction volume, such as 0 to 800 vol % of the total reaction volume, or 0 to 100 vol % of the total reaction volume. In an independent embodiment, the alcohol and lipid biofuel precursors are present in ratios other than 9:1.

Also disclosed herein are embodiments of combinations, comprising, consisting essentially of, or consisting of a lipid, an alcohol, an inorganic catalyst, and an organic catalyst. In exemplary embodiments, the combination can comprise, consist essentially of, or consist of a lipid, methanol, potassium hydroxide, and morpholine. In an independent embodiment, the combination is free of, or does not include guanidine carbonate.

IV. Methods of Use

Figure 6:
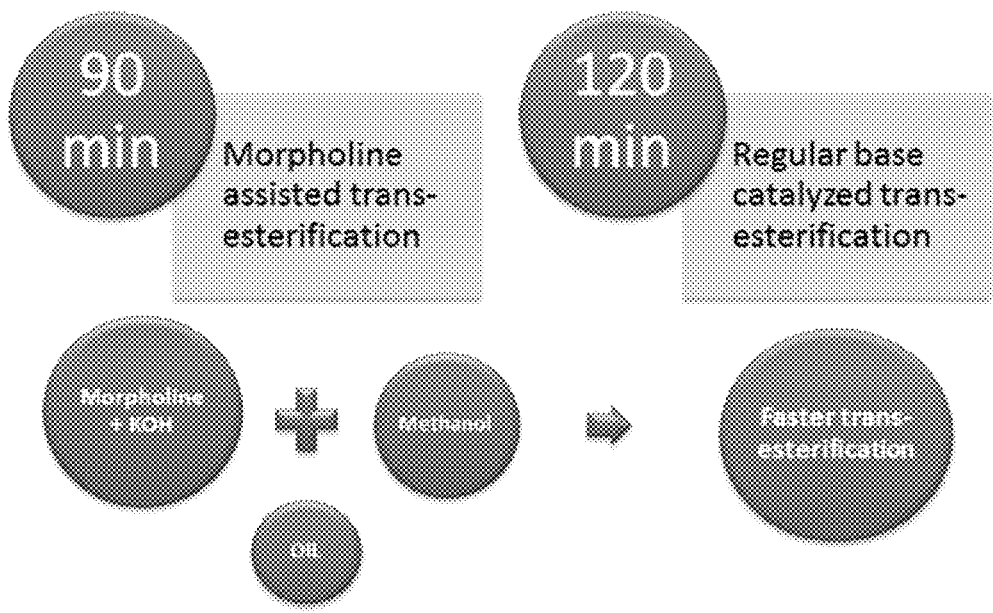
FIG. 6 is a schematic diagram illustrating an embodiment of using embodiments of the mixed catalyst composition disclosed herein.

Disclosed herein are embodiments of a method of making a biofuel. In some embodiments, the method can comprise, consist essentially of, or consist of combining a lipid, an alcohol, and a mixed catalyst composition comprising, consisting essentially of, or consisting of at least one inorganic catalyst and at least one organic catalyst. In particular disclosed embodiments, the organic catalyst component used in the method is a cyclic organic catalyst. An exemplary method is schematically illustrated in FIG. 6.

Figure 2:
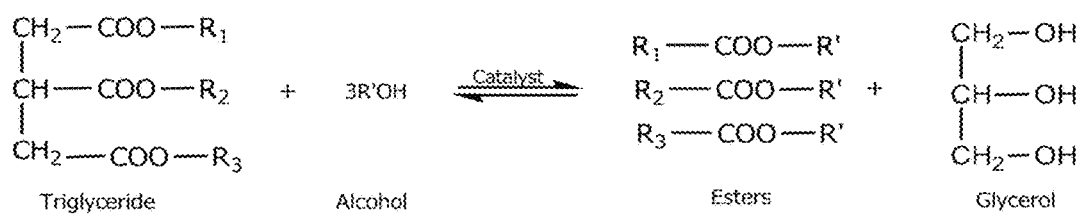
FIG. 2 is a schematic diagram illustrating the transesterification reaction of a triglyceride with an alcohol, for example, methanol or ethanol.

In some embodiments, the methods of making biofuel can comprise catalyzing a transesterification reaction between a lipid and an alcohol using a mixed catalyst composition disclosed herein. FIG. 2 represents a generic transesterification reaction in which the oil or fat is reacted with a monohydric alcohol in the presence of a catalyst, such as the mixed catalyst compositions disclosed herein, to form the corresponding alkyl esters. In some embodiments, the alcohol can be added in excess to force the reaction in a forward direction. Suitable amounts are provided above.

In some embodiments, the method of making biofuel can comprise combining a lipid, an alcohol, and a mixed catalyst composition. In exemplary embodiments, a catalyst, such as a mixed catalyst composition disclosed herein, can be mixed with the alcohol using an appropriate mixing tool, such as a standard mixer, to form an alkoxide species. In some embodiments, the method of making biofuel can comprise combining a lipid, an alcohol, and a mixed catalyst composition in a continuous flow system, a batch system, a semi-batch system, or a combination thereof. In some embodiments, the alkoxide species can be added into a reaction vessel comprising, consisting essentially of, or consisting of the lipid. In other embodiments, an alkoxide species can be generated in situ by mixing the mixed catalyst composition with the alcohol in the presence of the lipid. In some embodiments, the lipid, alcohol, mixed catalyst composition, or combinations thereof can be mixed in a closed, or substantially closed vessel, which can, in some embodiments, prevent alcohol loss (such as through evaporation).

In some embodiments, the lipid, alcohol, mixed catalyst composition, and combinations thereof can be combined and mixed for a particular time period, such as 0.001 to 200 hours, such as 1 to 500 minutes, or 20 to 120 minutes. In exemplary embodiments, the lipid, alcohol, mixed catalyst composition, and combinations thereof, can be mixed for 1 hour to 8 hours.

In some embodiments, the lipid, alcohol, mixed catalyst composition, and combinations thereof, can be mixed under ambient conditions, such as at an ambient temperature. In other embodiments, the lipid, alcohol, mixed catalyst composition, and combinations thereof, can be mixed at a temperature sufficient to enhance reaction kinetics, such as temperatures above ambient temperature. In some embodiments, the lipid, alcohol, mixed catalyst composition, and combinations thereof, can be mixed at temperatures ranging from 25° C. to 150° C., such as 35° C. to 100° C., or 50° C. to 80° C. In exemplary embodiments, the reaction can be conducted at 70° C.

In some embodiments, the biofuel may be isolated. In some embodiments, isolating the biofuel can comprise, consist essentially of, or consist of separating the biofuel from any by-products or remaining reaction components. In some embodiments, isolating can further comprise, consist essentially of, or consist of purifying the biofuel by washing the biofuel with warm water to remove any traces of residual catalyst(s) or soap.

The mixed catalyst compositions disclosed herein can be used to reduce the amount of time needed to achieve a maximum conversion of a lipid to a biofuel. In some embodiments, the amount of time needed for maximum conversion can be reduced by 1 to 1000%, such as 10 to 500%, or 20 to 100%. In exemplary embodiments, maximum conversion of biofuel precursor(s) to biofuel can utilize 25% to 50% less time with the mixed catalyst composition compared to an individual inorganic catalyst or an individual organic catalyst. In some embodiments, the organic catalyst, alone, may or may not be capable of making biofuel.

The mixed catalyst composition embodiments disclosed herein can enhance biofuel production by reducing the amount of time needed to make the biofuel. In some embodiments, the disclosed catalysts, or compositions thereof, can enhance or increase the amount of biofuel produced by at least 10%, at least 20%, at least 50%, or even at least 90%, including between 10% to 95%, 20% to 80%, 30% to 70%, 40% to 50%, such as 10%, 20%, 30%, 40%, 50%, 60%, 70%, 80%, 85%, 90%, 95%, 98%, or 100%. In some embodiments, the mixed catalyst composition can enhance biofuel production by reducing the amount of time needed to produce the biofuel by 25% to 75% as compared to the time needed to produce the biofuel using an inorganic catalyst component or an organic catalyst component independently. Such increases can be measured using the methods disclosed herein or otherwise known by those of ordinary skill in the art.

The methods of making biofuel that are disclosed herein can produce high yields of biofuels (e.g., greater than 80%) and there was no significant proportional variation between different oils used. In some embodiments, the mixed catalyst composition may or may not result in a complete conversion of all fatty acid(s) to biofuel. Without being limited to a single theory of operation, it is currently believed that traces of glycerides may remain unconverted to biofuel due to the equilibrium attained between products and reactants.

Figure 3:
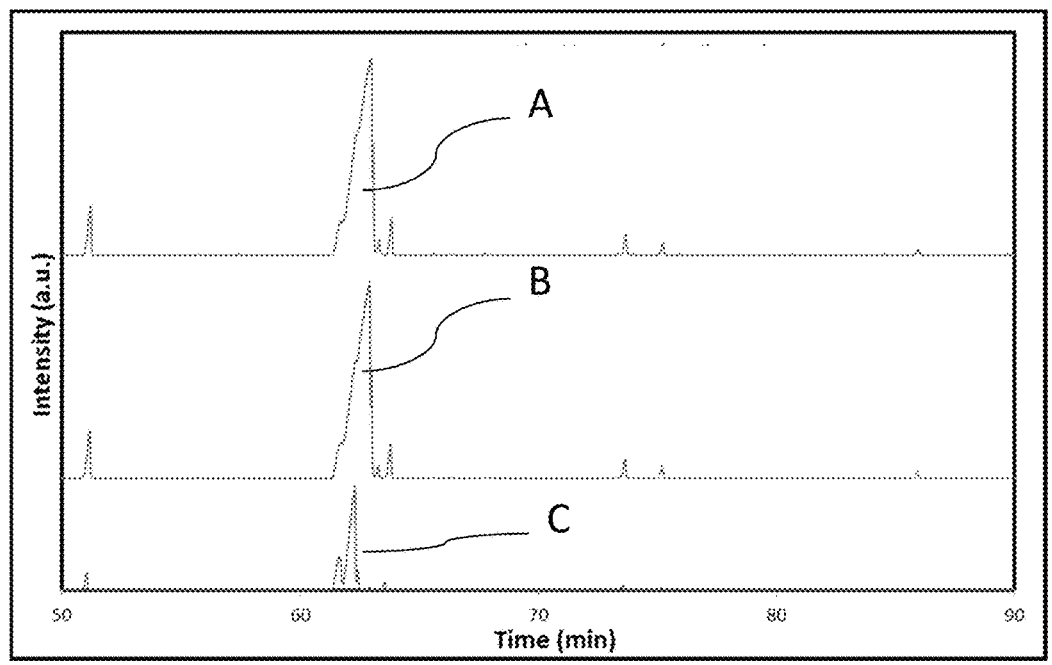
FIG. 3 is an image of overlaid GCMS spectra representing methyl ester formation with canola oil in the presence and absence of morpholine; the spectra of fatty acid methyl esters formed with KOH at 2 hours and a mixed KOH-morpholine catalyst composition at 1 hour are almost identical at the end of experimental time.

In exemplary embodiments, the methods can be used to convert oils, such as canola, corn, and coffee oils, into biofuel. Exemplary oils, such as canola, corn, and coffee oils can comprise a free fatty acid content of 0.15%, 0.17%, and 3.2% as oleic acid, respectively. FIG. 3 illustrates a gas chromatogram of a biofuel product, canola methyl ester, made by transesterification of canola oil and methanol at 70° C. in the presence of 1.5% (w/w) KOH (1 hour reaction time—peak C), 1.5% (w/w) KOH (2 hours reaction time—peak B), and a mixed catalyst composition comprising KOH-morpholine (0.75 wt % KOH added to 0.75 wt % morpholine—peak A). Chromatograms, such as the chromatogram illustrated in FIG. 3, can be used to confirm that the reaction has occurred, or has begun to occur.

In some embodiments, the identities of the biofuel products, such as individual methyl esters formed using the components disclosed herein, can be confirmed using mass spectroscopy. In some embodiments, individual esters formed were identified (e.g., C16:0, C18:0, C18:1, C18:2, C18:3, and C22:1). For particular embodiments, methods of making biofuel disclosed herein are effective to make biofuel using less reaction time than is required by reactions that do not use the disclosed mixed catalyst compositions. For example, FIG. 3 illustrates that an exemplary embodiment of a KOH-morpholine mixed catalyst composition (peak A) was as effective as its homogenous counterpart (peaks B and C) in the conversion of the free fatty acids present in canola oil into methyl esters; however, the reaction took place at a faster rate using the mixed catalyst composition.

Figure 4:
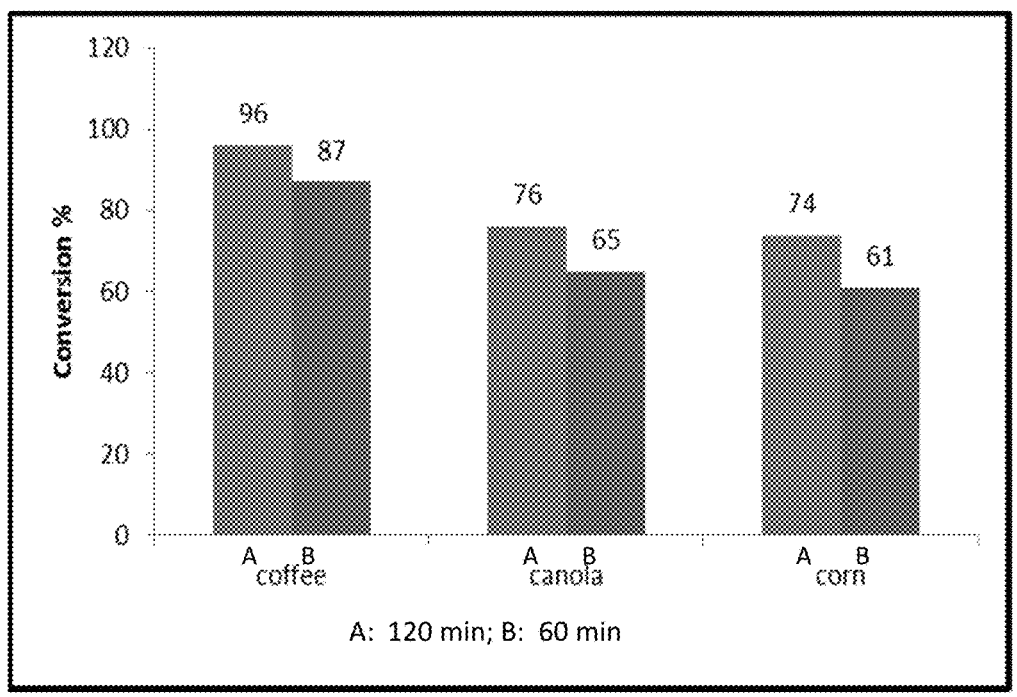
FIG. 4 is a graph of fatty acid methyl esters (FAMEs) conversion values obtained when KOH was used as a catalyst; amount of FAMEs produced after 120 minutes of reaction was higher than that produced after 60 minutes.
Figure 5:
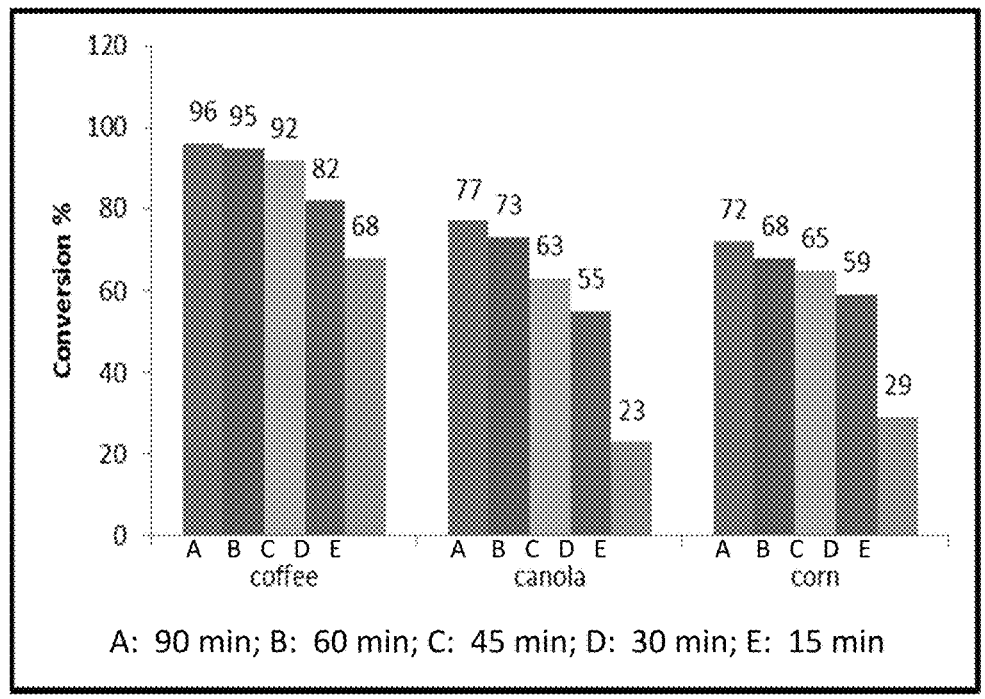
FIG. 5 is a graph of FAME conversion values obtained when a mixed KOH-morpholine catalyst composition was used as a catalyst; conversion values calculated at regular time intervals are reported and the KOH-morpholine mixture catalyzed the TE reaction much faster than KOH and conversion similar to or better than that from 120 minutes of reaction using KOH was achieved at the end of only 90 minutes using KOH-morpholine mixture resulting in at least 25% enhanced kinetics.

Without being limited to a particular theory of operation, it is currently believed that the use of an organic catalyst with an inorganic catalyst can enhance the reaction kinetics of biofuel production. FIGS. 4 and 5 illustrate the conversion (in percentage) of particular embodiments disclosed herein. FIG. 4 illustrates conversion rates obtained when canola, coffee and corn oil were subjected to transesterification using KOH (FIG. 4) and FIG. 5 illustrates results obtained from using a KOH-morpholine mixed catalyst composition. As illustrated by FIG. 4, after 120 minutes of reaction using KOH as a catalyst, the maximum conversion obtained with coffee, canola and corn oil was ~96%, ~76% and ~74%, respectively, whereas the use of a disclosed KOH-morpholine mixed catalyst composition resulted in maximum observed conversion of ~96%, ~77% and ~72%, for coffee, canola and corn oil feedstock, respectively, after just 90 minutes of reaction time (FIG. 5). Thus, the addition of morpholine led to a decrease (90 min) in the time required to achieve the equivalent conversion (120 min) in the absence of morpholine. In embodiments where the feedstock was coffee oil, the KOH-morpholine mixed catalyst composition resulted in similar conversion (95%) after just 60 minutes of reaction. The total amount of catalyst that was used was the same in all reactions and in some embodiments, the addition of small amounts of morpholine result in a large difference in the reaction rates.

V. Examples

Example 1

Canola oil and corn oil were obtained from local stores. Coffee oil was extracted using hexane as described by Kondamudi et al., Applied Catalysis A: General, 2011, 393, 36, the relevant portion of which is incorporated herein by reference. The free fatty acid content in the oils was analyzed using the AOCS official method Ca 5a-40. Methanol, KOH, morpholine, and ethoxy ethyl amine were of analytical or better grade. Working embodiments were conducted in a 100 mL batch reactor, which was contained in a mineral oil bath. The reaction mixture was agitated by a magnetic stirrer. Following completion of reaction, excess alcohol was recovered using a rotary evaporator and the produced biodiesel was washed and analyzed. The identities and relative proportions of fatty acids in the methyl ester product were determined using a Shimadzu GC QP-2010 gas chromatograph (GCMS). The GC was equipped with a SHR-5XLB capillary column (25 mm thickness×30 m length) and was attached to a mass spectrometer operating an electron ionization detector (70 eV) and used helium as a reagent gas. A temperature gradient was selected so that the temperature rose from 100° C. to 240° C. at the rate of 1.5° C./min.

TABLE 1

Experimental pattern. The "✓" indicates transesterification was performed under optimized conditions (methanol 40 vol % and reaction temperature, 70° C.).

| Corn, Canola & Coffee oils | 15 minutes | 30 minutes | 45 minutes | 60 minutes | 90 minutes | 120 minutes |
|---|---|---|---|---|---|---|
| KOH | | | | ✓ | | ✓ |
| Morpholine | | ✓ | | ✓ | | ✓ |
| KOH-Morpholine mixture | ✓ | ✓ | ✓ | ✓ | ✓ | |
| Ethoxy Ethyl Amine (canola oil) | | | | | | ✓ |
| KOH-Ethoxy ethyl amine mixture (canola oil) | | | | | | ✓ |

Particular embodiments disclosed above, such as in Table 1, were conducted with five different catalyst types: (1) KOH (inorganic catalyst used in industrial production of biodiesel), (2) morpholine (pure organic catalyst), (3) ethoxy ethyl amine (EEA), and mixtures of organic and inorganic catalysts namely, (4) KOH-morpholine and (5) KOH-EEA. These embodiments were used, for example, to determine if morpholine would increase the reaction kinetics when used in conjunction with KOH.

In some embodiments, the following reaction conditions and reagent amounts were used: 70° C. reaction temperature, 1.5 wt % of oil as amount of catalyst, 2 hours reaction time, and 40 vol % of methanol. In some embodiments, catalyst mixtures were prepared by mixing equal amounts of organic and inorganic catalyst. In exemplary working embodiments, the catalyst was dissolved in the desired amount of methanol and this alcohol-catalyst composition was added to the oil. In some embodiments, the reaction was assumed to have been initiated at the time that the alcohol-catalyst composition was added to the oil.

In exemplary working embodiments, the system was maintained under atmospheric pressure. Agitation was kept constant at 600 rpm to maintain uniform mass transfer in the system. Details are given in Table 1. Reaction time was varied between 15 minutes to 2 hours (as seen in Table 1). The samples were then collected and analyzed using GCMS to determine the fatty acid content, tri-glycerides (TG), diglycerides (DG), mono-glycerides (MG) and also to identify the methyl esters. In some embodiments, reactions and analyses were conducted in triplicates and the mean values are reported herein. The percent conversion was calculated by using the formula given below.

$$\text{conversion \%} = \frac{\text{acid value (initial)} - \text{acid value (final)}}{\text{acid value (initial)}} \times 100\%$$

In an independent embodiment, ethoxy ethyl amine (EEA) was employed as a catalyst, both in the presence and absence of KOH, to investigate whether the acceleration of reaction kinetics observed in the presence of morpholine is applicable to other organic catalyst components. In an independent embodiment, no methyl ester formation was observed using EEA, which, without being limited to a single theory of operation, could indicate that EEA does not act in a manner similar to morpholine.

Example 2

Crude Canola oil and Corn oil were obtained from Viesel Fuel, LLC. Coffee oil was extracted using a Soxhlet extractor. This extractor uses hexane to extract the coffee oil and is recycled. It is efficient and uses the least amount of hexane. The FFA content in the oils was analyzed using the AOCS official method Ca 5a-40. Methanol, NaOH and morpholine used in this example were of analytical or better grade. The studies were conducted in 80 mL screw-capped vials placed inside a reciprocal shaker maintained at 65° C. throughout the duration of the experiment. The reaction mixture was agitated at 225 rpm. Samples were taken from the reaction mixture at specified time intervals. Following completion of reaction, the mixture was centrifuged and the biodiesel obtained was washed with warm water. The Eurofins QTA system method was used to test the in-process biodiesel, glycerin, B100 finished biodiesel and the feedstock.

Figure 7:
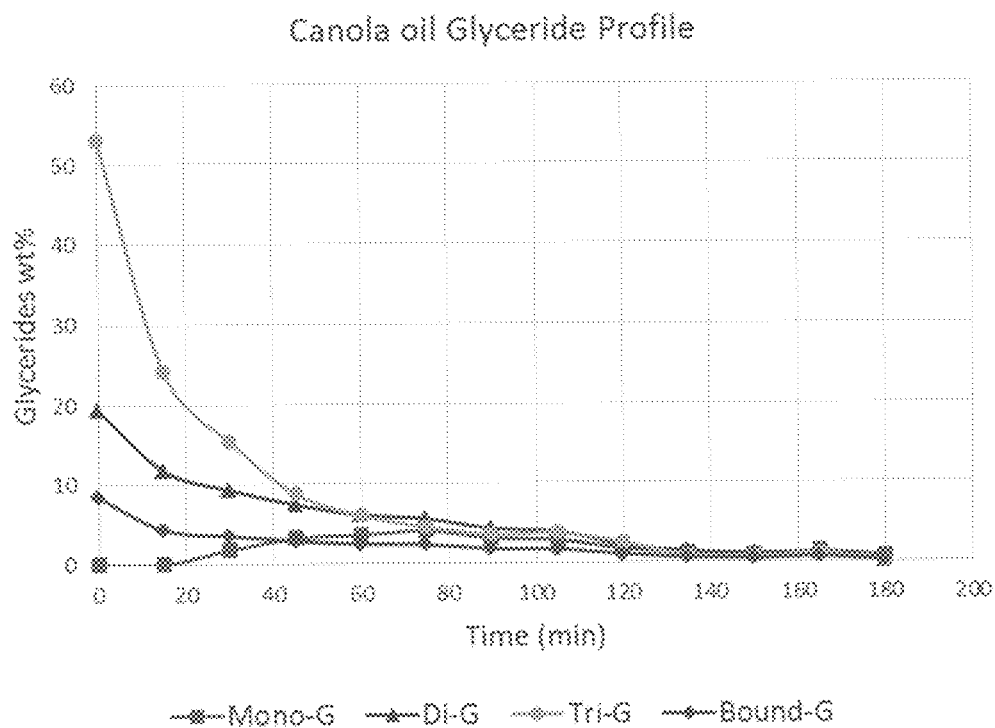
FIG. 7 is a graph of glycerides (wt %) as a function of time (minutes) illustrating concentration trajectories at constant temperature for base catalytic transesterification using NaOH and MeOH with canola oil.
Figure 8:
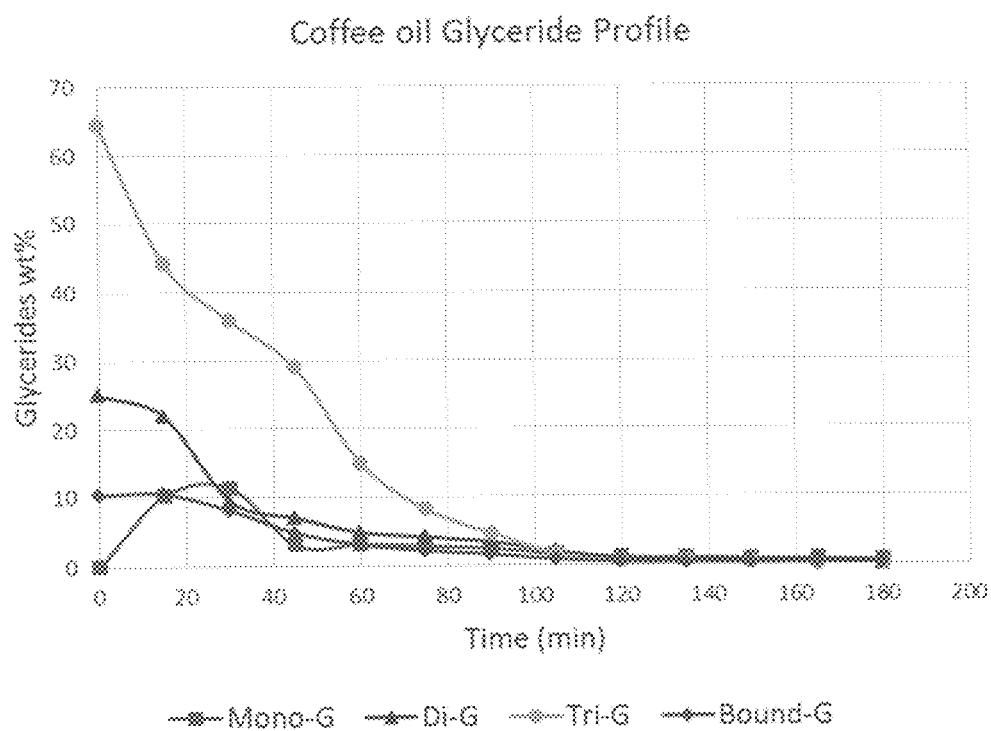
FIG. 8 is a graph of glycerides (wt %) as a function of time (minutes) illustrating concentration trajectories at constant temperature for base catalytic transesterification using NaOH and MeOH with coffee oil.
Figure 9:
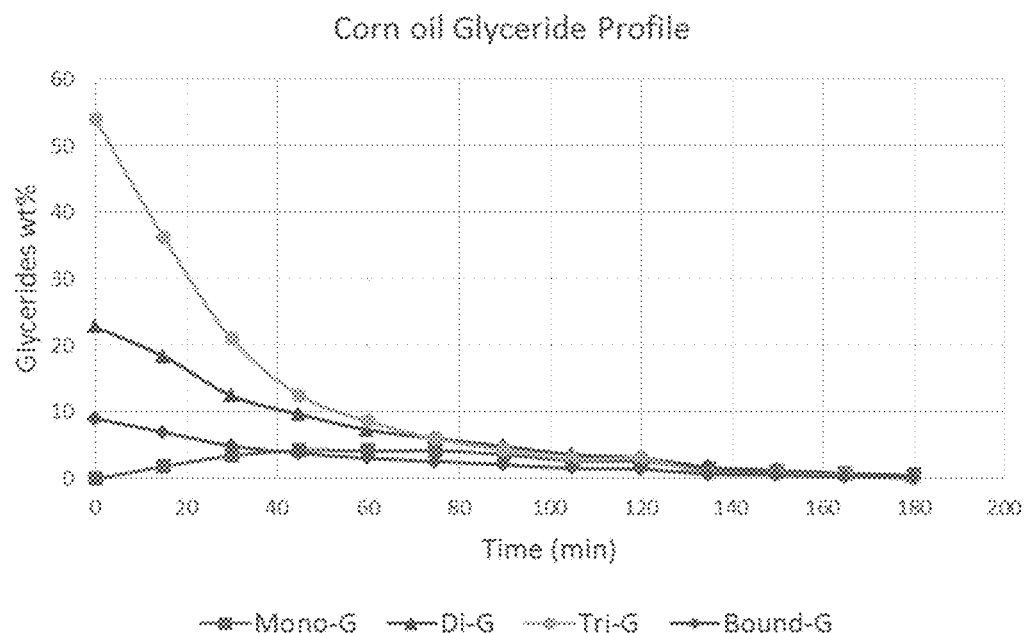
FIG. 9 is a graph of glycerides (wt %) as a function of time (minutes) illustrating concentration trajectories at constant temperature for base catalytic transesterification using NaOH and MeOH with corn oil.

FIGS. 7-9 represent the time dependent concentration profiles of tri-, di-, and mono-glycerides and the amount of bound glycerin remaining in the biodiesel product when crude canola (FIG. 7), crude coffee (FIG. 8) and corn oil (FIG. 9) were used as a feedstock for the production of biodiesel respectively. Crude canola, crude coffee and corn oils were determined to have a FFA content of 0.65%, 3.4% and 0.6% as oleic acid, respectively.

Figure 10:
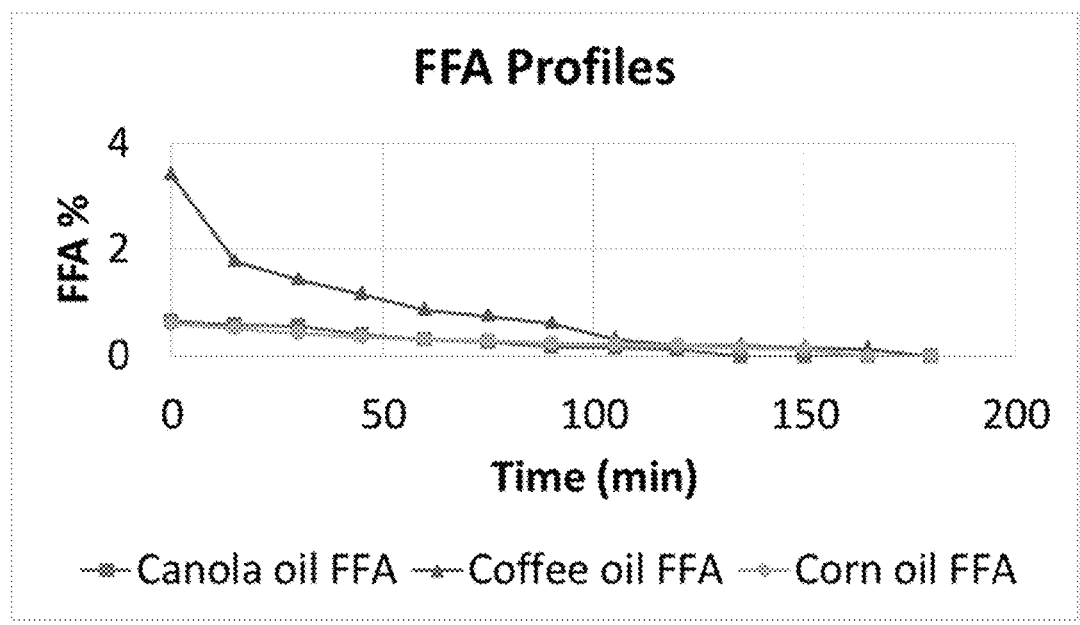
FIG. 10 is a graph of free fatty acids or "FFA" (%) as a function of time (minutes) observed using NaOH at a concentration of 1.5 wt %.

Without being limited to a particular mode of operation, it is currently believed that NaOH catalyzed transesterification reaction for biodiesel production with methanol involves three reversible steps. Triglycerides (TG) react with alcohol to produce diglycerides (DG) which further reacts to produce monoglycerides (MG). Finally, MG reacts with alcohol to give glycerol as by product. At each reaction step, one molecule of biodiesel is produced for each molecule of alcohol consumed. It can be seen from FIGS. 7-9 that, at the end of 180 min, the bound glycerin values dropped below 0.2. At this point, almost all of the glycerides have reacted and biodiesel product is formed. The FFA reduction over 180 minutes of reaction time is shown in FIG. 10. Almost 100% reduction in FFA was observed at the end of 135 minutes, 180 minutes and 165 minutes for canola, coffee and corn oil respectively.

Figure 11:
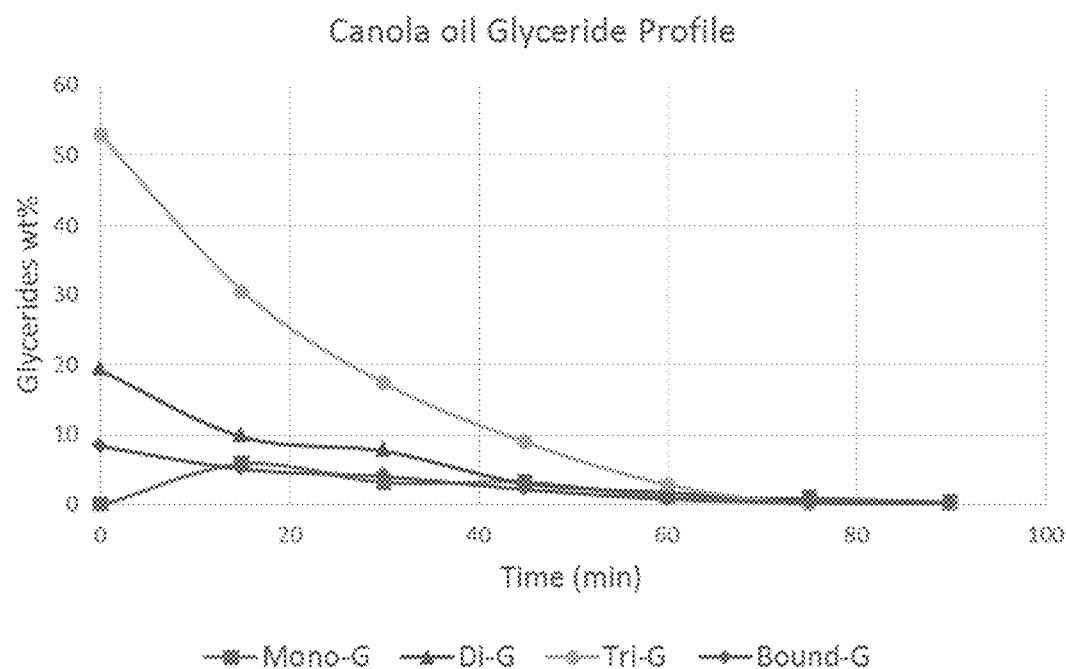
FIG. 11 is a graph of glycerides (wt %) as a function of time (minutes) illustrating concentration trajectories at constant temperature for base catalytic transesterification using NaOH in combination with morpholine and MeOH with canola oil.
Figure 12:
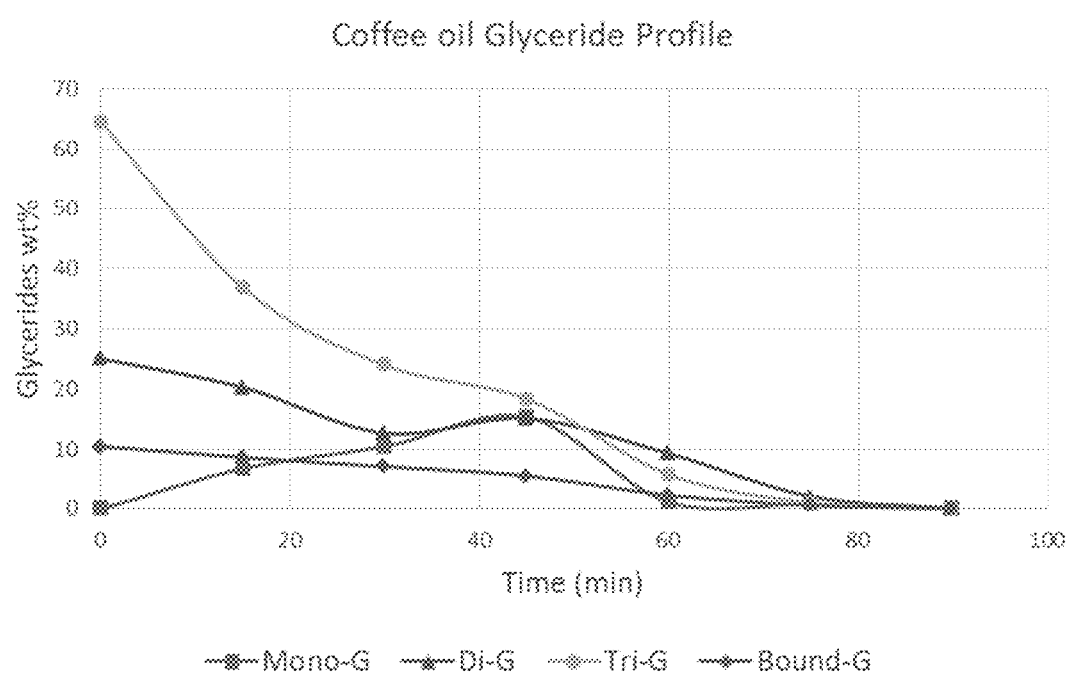
FIG. 12 is a graph of glycerides (wt %) as a function of time (minutes) illustrating concentration trajectories at constant temperature for base catalytic transesterification using NaOH in combination with morpholine and MeOH with coffee oil.
Figure 13:
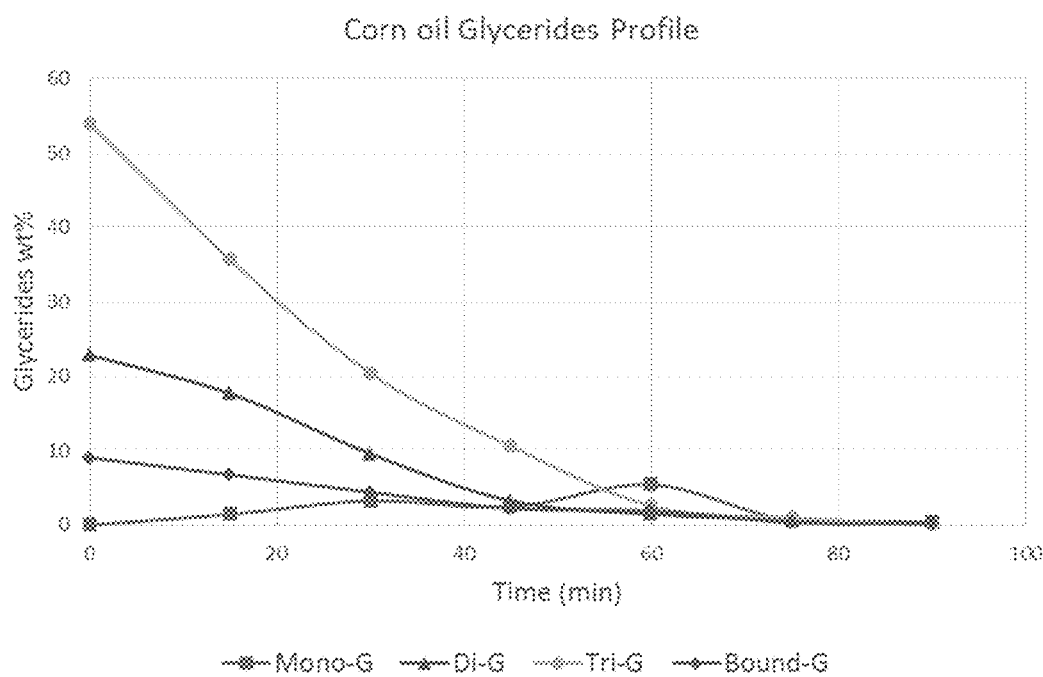
FIG. 13 is a graph of glycerides (wt %) as a function of time (minutes) illustrating concentration trajectories at constant temperature for base catalytic transesterification using NaOH in combination with morpholine and MeOH with corn oil.
Figure 14:
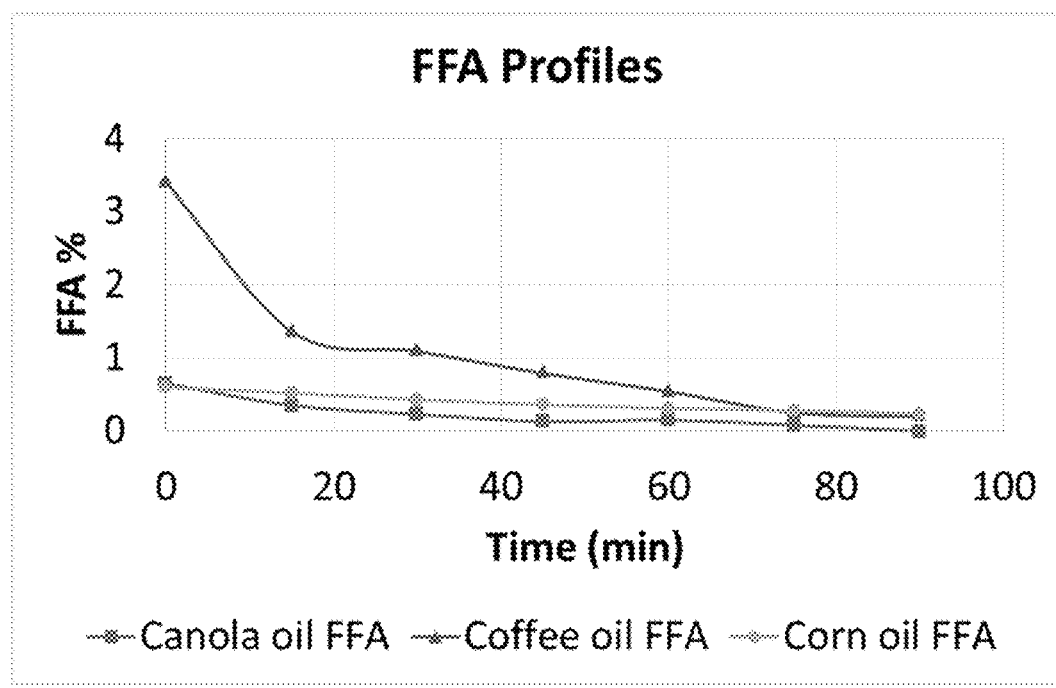
FIG. 14 is a graph of free fatty acids or "FFA" (%) as a function of time (minutes) observed using NaOH in combination with morpholine.

To speed up trans-esterification reaction, morpholine was used as a co-catalyst to produce biodiesel. It not only saves time and energy but also lowers the chemical dosage. It offers the potential for shorter reaction times leading to less expensive and smaller chemical plants. The relationship of different glycerides reacted with methanol against the reaction time for crude canola, crude coffee and corn oil is shown in FIGS. 11-13, respectively. The displayed results, also, indicate the key effect of the addition of morpholine on the transesterification process. It was observed that the maximum conversion of the glycerides was obtained at the end of 90 minutes and the biodiesel produced was of ASTM D6751 grade. The FFA reduction was also monitored and is shown in FIG. 14. Greater than 99.5% conversion in FFA was obtained when morpholine was used as a co-catalyst in the process.

Fuel properties were analyzed including fatty acid profile, free and total glycerol, acid number, sulfur content, water content and Cold Soak Filtration Test (CSFT). Fuel properties of the biodiesel were found to meet or exceed ASTM standards for use in on-road vehicles. Therefore it is predicted that biodiesel produced using morpholine can be used in diesel engines without a decrease in engine performance.

TABLE 2

Fuel properties of crude canola, crude coffee and corn oils and their corresponding biodiesel ASTM standards.

| Method | Test | Canola Bio | Coffee Bio | Corn Bio | Unit | Spec. |
|---|---|---|---|---|---|---|
| ASTM D4052 | API Gravity @ 60° F. | 28.1 | 28.1 | 28.1 | ° API | |
| ASTM D93 | Procedure Used | C | C | C | | |
| ASTM D93 | Corrected Flash Point | 140 | 140 | 140 | ° C. | 130 Min |
| ASTM D2709 | Sediment and Water | 0 | 0 | 0 | Vol % | 0.050 Max |
| ASTM D445 | Kinematic Viscosity @140° F./40° C. | 4.781 | 4.801 | 4.782 | cSt | 1.9 Min-6.0 Max |
| ASTM D874 | Sulfated Ash | <0.005 | <0.005 | <0.005 | Wt % | 0.020 Max |
| ASTM D5453 | Sulfur | 7.2 | 8.2 | 9.1 | mg/kg | 15 Max |
| ASTM D130 | Biodiesel Cu Corrosion 50° C. (122° F.)/3 hr | 1a | 1a | 1a | | 3 Max |
| ASTM D613 | Cetane number | 55.1 | 53.4 | 52.4 | | 47 Min |
| ASTM D2500 | Cloud Point | −1 | 1 | −1 | ° C. | |
| ASTM D2500 | Cloud Point | 30.2 | 33.8 | 30.2 | ° F. | |
| ASTM D4530 MOD | Average Micro Method Carbon Residue (6751) | 0.001 | 0.005 | 0.002 | Wt % | 0.050 Max |
| ASTM D664 | Procedure Used | B | B | B | | |
| ASTM D664 | Acid Number | 0.04 | 0.42 | 0.51 | mg KOH/g | 0.50 Max |
| ASTM D6584 | Free Glycerin | 0.00 | 0.00 | 0.00 | Wt % | 0.02 |
| ASTM D6584 | Monoglycerides | 0.4 | 0.15 | 0.4 | Wt % | |
| ASTM D6584 | Diglycerides | 0.1 | 0.12 | 0.4 | Wt % | |
| ASTM D6584 | Triglycerides | 0.1 | 0 | 0.08 | Wt % | |
| ASTM D6584 | Total Glycerin | 0.143 | 0.05 | 0.168 | Wt % | 0.240 Max |
| ASTM D4951 | Phosphorous | <0.0010 | <0.0010 | <0.0010 | Wt % | 0.001 Max |
| EN 14538 | Calcium Content | <1.0 | <1.0 | <1.0 | mg/kg | (Ca + Mg) 5 Max |
| EN 14538 | Magnesium Content | <1.0 | <1.0 | <1.0 | mg/kg | |
| EN 14538 | Potassium Content | <1.0 | <1.0 | <1.0 | mg/kg | (K + Na) 5 Max |
| EN 14538 | Sodium Content | <1.0 | <1.0 | <1.0 | mg/kg | |
| EN 14112 | Oxidation Stability | 13.4 | 3.6 | 8.2 | h | 3 Min |
| ASTM D1160 | IBP | 268 | 261 | 290 | ° C. | |
| ASTM D1160 | AET @ 5% Recovery | 345 | 344 | 346 | ° C. | |
| ASTM D1160 | AET @ 10% Recovery | 347 | 345 | 346 | ° C. | |
| ASTM D1160 | AET @ 20% Recovery | 348 | 346 | 347 | ° C. | |
| ASTM D1160 | AET @ 30% Recovery | 349 | 347 | 348 | ° C. | |
| ASTM D1160 | AET @ 40% Recovery | 349 | 348 | 348 | ° C. | |
| ASTM D1160 | AET @ 50% Recovery | 350 | 349 | 349 | ° C. | |

TABLE 2-continued

Fuel properties of crude canola, crude coffee and corn oils and their corresponding biodiesel ASTM standards.

| Method | Test | Canola Bio | Coffee Bio | Corn Bio | Unit | Spec. |
|---|---|---|---|---|---|---|
| ASTM D1160 | AET @ 60% Recovery | 351 | 350 | 350 | ° C. | |
| ASTM D1160 | AET @ 70% Recovery | 352 | 351 | 352 | ° C. | |
| ASTM D1160 | AET @ 80% Recovery | 354 | 353 | 354 | ° C. | |
| ASTM D1160 | AET @ 90% Recovery | 358 | 357 | 357 | ° C. | 360 Max |
| ASTM D1160 | AET @ 95% Recovery | 366 | 360 | 377 | ° C. | |
| ASTM D1160 | FBP | 380 | 389 | 382 | ° C. | |
| ASTM D1160 | % Recovered | 97.00 | 98.50 | 96.00 | % | |
| ASTM D1160 | % Loss | 0.00 | 0.00 | 0.00 | % | |
| ASTM D1160 | % Residue | 3.00 | 1.50 | 4.00 | % | |
| ASTM D7501 | Volume Filtered | 300 | 300 | 300 | ml | |
| ASTM D7501 | B100 CSFT Time | 120 | 128 | 230 | sec | 360 Max |

The results for the ASTM testing conducted on the B100 biodiesel (process using morpholine and NaOH) are shown in Table 2.

Typically, fuel and chemical properties predicts the nature of the derived fuel from source and process efficiency (yield/conversion) while selecting the process option and downstream strategies for separation followed by purification of products/by product. These results indicate that addition of morpholine did not have any detrimental effect on the properties of the fuel. It is possible that unreacted morpholine was removed during the purification steps. All FAMEs provided acid values significantly below the maximum threshold of 0.50 mg KOH/g as specified in ASTM D6751 and EN 14214. The free and total glycerol contents of the FAMEs were within the limits specified in the biodiesel standards. Flash point and moisture content of all samples were within the specifications listed in the biodiesel standards, where applicable.

In view of the many possible embodiments to which the principles of the present disclosure may be applied, it should be recognized that the illustrated embodiments are only preferred examples of the present disclosure and should not be taken as limiting the scope of the invention. Rather, the scope of the present disclosure is defined by the following claims. I therefore claim as my invention all that comes within the scope and spirit of these claims.

I claim:

1. A combination, comprising:
an inorganic catalyst;
morpholine;
a lipid; and
an alcohol.

2. The combination of claim 1, wherein the combination produces biofuel.

3. The combination of claim 1, wherein the amount of the inorganic catalyst present in the combination is equal to the amount of morpholine present in the combination.

4. The combination of claim 1, wherein the amount of the inorganic catalyst ranges from 0.01 wt % to 500 wt % of the total lipid weight and wherein the amount of the morpholine ranges from 0.01 wt % to 500 wt % of the total lipid weight.

5. The combination of claim 1, wherein the inorganic catalyst is selected from KOH, NaOH, or a combination thereof; the lipid is selected from rapeseed oil, soybean oil, sunflower oil, flax oil, jojoba oil, mustard oil, palm oil, coconut oil, hemp oil, waste vegetable oil, corn oil, canola oil, coffee oils, tallow, lard, chicken fat, or a combination thereof; and the alcohol is selected from methanol, ethanol, propanol, butanol, or a combination thereof.

* * * * *

UNITED STATES PATENT AND TRADEMARK OFFICE
CERTIFICATE OF CORRECTION

PATENT NO. : 10,030,205 B2
APPLICATION NO. : 14/815618
DATED : July 24, 2018
INVENTOR(S) : Chidambaram Page 1 of 1

It is certified that error appears in the above-identified patent and that said Letters Patent is hereby corrected as shown below:

On the Title Page

Item (72), add --Dharshini D. Balasubramaniyan, Greensboro, NC (US)--.

Signed and Sealed this
Twenty-eighth Day of May, 2019

Andrei Iancu
*Director of the United States Patent and Trademark Office*